(12) United States Patent
Kim et al.

(10) Patent No.: US 11,828,878 B2
(45) Date of Patent: Nov. 28, 2023

(54) LIDAR SYSTEM AND OPERATING METHOD THEREOF

(71) Applicant: HYUNDAI MOBIS Co., Ltd., Seoul (KR)

(72) Inventors: Young Shin Kim, Yongin-si (KR); Won Gyum Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 1113 days.

(21) Appl. No.: 16/402,107

(22) Filed: May 2, 2019

(65) Prior Publication Data

US 2020/0025889 A1 Jan. 23, 2020

(30) Foreign Application Priority Data

Jul. 20, 2018 (KR) .................. 10-2018-0084568

(51) Int. Cl.
*G01S 7/481* (2006.01)
*G01S 7/484* (2006.01)
(Continued)

(52) U.S. Cl.
CPC ............ *G01S 7/4817* (2013.01); *G01S 7/484* (2013.01); *G01S 7/4811* (2013.01); *G01S 17/08* (2013.01);
(Continued)

(58) Field of Classification Search
CPC ...... G01S 7/4817; G01S 7/4811; G01S 7/484; G01S 17/42; G01S 17/58; G02B 26/101; G02B 26/0816
(Continued)

(56) References Cited

U.S. PATENT DOCUMENTS

| 10,078,132 | B2 * | 9/2018 | Ishikawa | ............... G01S 7/4817 |
| 2017/0219696 | A1 * | 8/2017 | Hayakawa | ............ G01S 7/4815 |

(Continued)

FOREIGN PATENT DOCUMENTS

| CN | 102445695 | | 5/2012 | |
| CN | 106986299 A | * | 7/2017 | ............... B81B 7/02 |

(Continued)

OTHER PUBLICATIONS

Machine Translation of WO 2017018065 A1 (Year: 2017).*

(Continued)

*Primary Examiner* — Yuqing Xiao
*Assistant Examiner* — Brian Zawacki
(74) *Attorney, Agent, or Firm* — H.C. Park & Associates, PLC

(57) ABSTRACT

A Light Detection And Ranging (LiDAR) system may include: a transmitter configured to output pulse laser; a reflecting mirror comprising two or more reflecting surfaces to reflect the pulse laser; a driver configured to rotate the reflecting mirror; a path control mirror configured to reflect the pulse laser to the reflecting surfaces of the reflecting mirror to form an optical path of the pulse laser; and a receiver configured to receive the light reflected through the reflecting mirror, and convert the received light into an electrical signal, wherein the reflecting mirror comprises: a first reflecting surface; and a second reflecting surface, wherein the first and second reflecting surfaces are connected to each other at one point, the first reflecting surface and the second reflecting surface have different tilt angles from each other, and the first reflecting surface is tilted in the opposite direction of the second reflecting surface.

6 Claims, 8 Drawing Sheets

(51) Int. Cl.
*G01S 1/08* (2006.01)
*G01S 17/10* (2020.01)
*G01S 17/42* (2006.01)
*G01S 17/58* (2006.01)
*G02B 26/08* (2006.01)
*G02B 26/10* (2006.01)
*G01S 17/08* (2006.01)

(52) U.S. Cl.
CPC ............. *G01S 17/10* (2013.01); *G01S 17/42* (2013.01); *G01S 17/58* (2013.01); *G02B 26/0816* (2013.01); *G02B 26/101* (2013.01)

(58) Field of Classification Search
USPC ........................................ 356/5.01
See application file for complete search history.

(56) References Cited

U.S. PATENT DOCUMENTS

2019/0056541 A1* 2/2019 Roberts .................. G02B 5/122
2019/0324125 A1 10/2019 Choi et al.

FOREIGN PATENT DOCUMENTS

| | | | | |
|---|---|---|---|---|
| CN | 206710256 | | 12/2017 | |
| EP | 2395368 A1 | * | 12/2011 | ............. G01S 17/10 |
| JP | H06242224 A | * | 9/1994 | ............. B60R 21/00 |
| JP | 2010-038859 | | 2/2010 | |
| JP | 5934628 B2 | * | 6/2016 | ............. G01S 17/42 |
| JP | 2017-173298 | | 9/2017 | |
| KR | 10-1334498 | * | 11/2013 | ......... H01S 3/06754 |
| KR | 10-2016-0034719 | | 3/2016 | |
| KR | 10-2018-0080384 | | 7/2018 | |
| WO | WO-2017018065 A1 | * | 2/2017 | ........... G01S 7/4817 |
| WO | WO-2017135224 A1 | * | 8/2017 | ............. G01B 11/00 |

OTHER PUBLICATIONS

Machine Translation of KR 101334498 B1 (Year: 2013).*
Machine Translation of WO 2017135224 A1 (Year: 2017).*
"How does a laser speed gun work to measure a car's speed?" Jun. 7, 2000. HowStuffWorks.com (Year: 2000).*
Citation information for Non-Patent Document X (Used solely to establish publishing date) (Year: 2000).*
Machine Translation of EP-2395368-A1 (used solely to establish motivation) (Year: 2011).*
Machine Translation of JPH06-242224 (contained within the same PDF as the original document, listed under Foreign Patent Documents) (used solely to establish motivation) (Year: 1994).*
Machine Translation of JP 5934628 B2 (Year: 2016).*
Machine Translation of CN-106986299-A (Year: 2017).*

* cited by examiner (b)

LIDAR SYSTEM AND OPERATING METHOD THEREOF

CROSS-REFERENCES TO RELATED APPLICATIONS

This application claims priority from and the benefit of Korean Patent Application No. 10-2018-0084568, filed on Jul. 20, 2018, which is hereby incorporated by reference for all purposes as if set forth herein.

BACKGROUND

Field

Exemplary embodiments relate to a LiDAR (Light Detection And Ranging) system and an operating method thereof.

In general, a LiDAR system refers to a system that can irradiate laser onto an object, analyze light reflected and returned by the object, and detect the distance to the object, and the direction, speed, temperature, material distribution and concentration of the object.

Discussion of the Background

FIG. 1 illustrates a part of an optical system of a LiDAR system according to the related art. The optical system of the LiDAR system reflects transmitted/received beams through first and second mirrors 110 and 120 having a vertical structure. The first and second mirrors 110 and 120 have different fields of view (FOVs). Therefore, when three pairs of transmitters and receivers 130 and 140 are applied, the optical system has the same effect as that obtained by six pairs of transmitters/receivers. The LiDAR system according to the related art has a disadvantage in that the amount of received light is reduced depending on the FOV. As the angle at which light is reflected by the first and second mirrors 110 and 120 becomes an obtuse angle, the detectable distance to the object may decrease toward the edge of a scan region. Such a problem occurs because the light receiving area differs depending on angles and is further narrowed at an obtuse angle. Another problem is that the maximum FOV of the first and second mirrors 110 and 120 is limited to 145 degrees.

The related art may include technical information which the present inventor has retained to derive the present invention or has acquired during the process of deriving the present invention. The related art may not be necessarily a publicly known technique which was published to the public before the application of the present invention.

Korean Patent Publication No. 2016-0034719

The above information disclosed in this Background section is only for enhancement of understanding of the background of the invention and, therefore, it may contain information that does not constitute prior art.

SUMMARY

Exemplary embodiments of the present invention are directed to a LiDAR (Light Detection And Ranging) system capable of maximizing a FOV while reducing a hardware unit price and size.

Also, embodiments of the present invention are directed to a LiDAR system having a sensing function in addition to a horizon detection function.

In one embodiment, a LiDAR system may include: a transmitter configured to output pulse laser; a reflecting mirror including two or more reflecting surfaces to reflect the pulse laser; a driver configured to rotate the reflecting mirror; a path control mirror configured to reflect the pulse laser to the reflecting surfaces of the reflecting mirror to form an optical path of the pulse laser; and a receiver configured to receive the light reflected through the reflecting mirror, and convert the received light into an electrical signal, wherein the reflecting mirror includes: a first reflecting surface; and a second reflecting surface, wherein the first and second reflecting surfaces are connected to each other at one point, the first reflecting surface and the second reflecting surface have different tilt angles from each other, and the first reflecting surface is tilted in the opposite direction of the second reflecting surface.

The first reflecting surface may reflect the pulse laser in a first direction parallel to a horizontal plane, and the second reflecting surface may reflect the pulse laser in a second direction perpendicular to the horizontal plane.

The first and second reflecting surfaces connected to each other at the one point may have V-shaped grooves corresponding to each other.

The driver may include a motor configured to rotate the reflecting mirror 360 degrees.

The LiDAR system may further include a controller configured to calculate the distance to an object and the speed of the object, using the electrical signal converted by the receiver.

The controller may adaptively change a pulse width of the pulse laser transmitted by the transmitter, a transmission repetition rate including the number of pulse lasers transmitted by the transmitter within a preset time, a reception repetition rate including the number of reflected lights received by the receiver within the preset time, and a power value of the pulse laser, according to the distance to the object and the speed of the object.

In another embodiment, an operating method of a LiDAR system may include: outputting, by a transmitter, pulse laser; reflecting, by a path control mirror, the pulse laser to form an optical path of the pulse laser; reflecting, by a reflecting mirror, the pulse laser reflected by the path control mirror, wherein the reflecting mirror is rotated by a driver and includes first and second reflecting surfaces which are connected to each other at one point and have different tilt angles; and receiving, by a receiver, light reflected through the reflecting mirror, and converting the received light into an electrical signal.

The first reflecting surface may reflect the pulse laser in a first direction parallel to a horizontal plane, and the second reflecting surface may reflect the pulse laser in a second direction perpendicular to the horizontal plane.

The operating method may further include rotating, by the driver, rotating the reflecting mirror 360 degrees.

The operating method may further include calculating, by a controller, the distance to an object and the speed of the object, using the electrical signal converted by the receiver.

The operating method may further include adaptively changing, by the controller, a pulse width of the pulse laser transmitted by the transmitter, a transmission repetition rate including the number of pulse lasers transmitted by the transmitter within a preset time, a reception repetition rate including the number of reflected lights received by the receiver within the preset time, and a power value of the pulse laser, according to the distance to the object and the speed of the object.

In addition, another method and system for implementing the present invention and a computer program for executing the method may be further provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
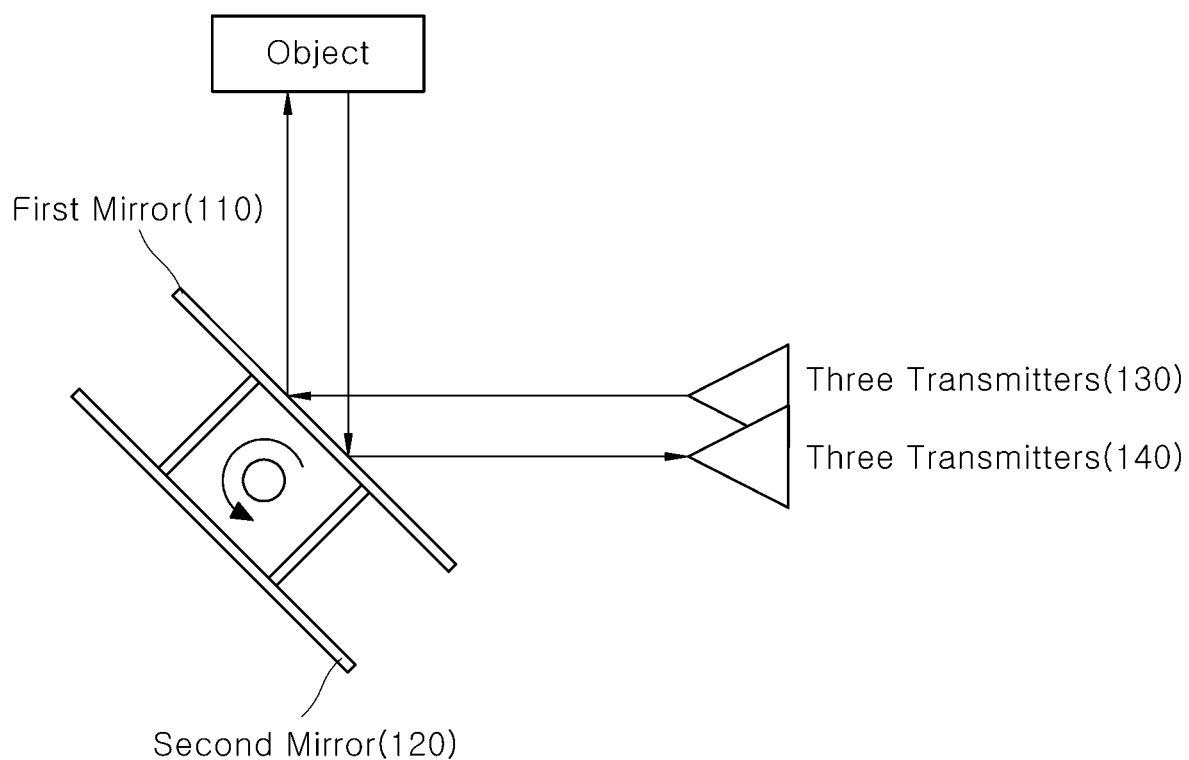
FIG. 1 illustrates a part of an optical system of a LiDAR system according to the related art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The advantages and characteristics of the present invention and a method for achieving the advantages and characteristics will be clarified through the following embodiments which will be described in detail with reference to the accompanying drawings. However, it should understood that the present invention is not limited to the following embodiments, can be embodied in various different forms, and includes all modifications, equivalents or substitutes which are included in the scope and technical range of the present invention. The following embodiments are provided to complete the disclosure of the present invention, such that the scope of the present invention can be fully understood by those skilled in the art to which the present invention pertains. Moreover, detailed descriptions related to publicly known functions or configurations will be ruled out in order not to unnecessarily obscure subject matters of the present invention.

The terms used in this application are only used to describe a specific embodiment, and not intended to limit the present invention. The terms of a singular form may include plural forms unless referred to the contrary. In this application, the meaning of "include" or "have" only specifies a property, number, step, operation, component, part or combinations thereof, and does not exclude one or more other properties, numbers, steps, operations, components, parts or combinations thereof. The terms such as first and second may be used to describe various components, but the components should not be limited by the terms. The terms are used only to distinguish one component from another component.

Hereafter, exemplary embodiments of the present invention will be described in detail with reference to the accompanying drawings. In the following descriptions with reference to the accompanying drawings, the same or corresponding components will be denoted by like reference numerals, and duplicated descriptions thereof will be omitted.

Figure 2:
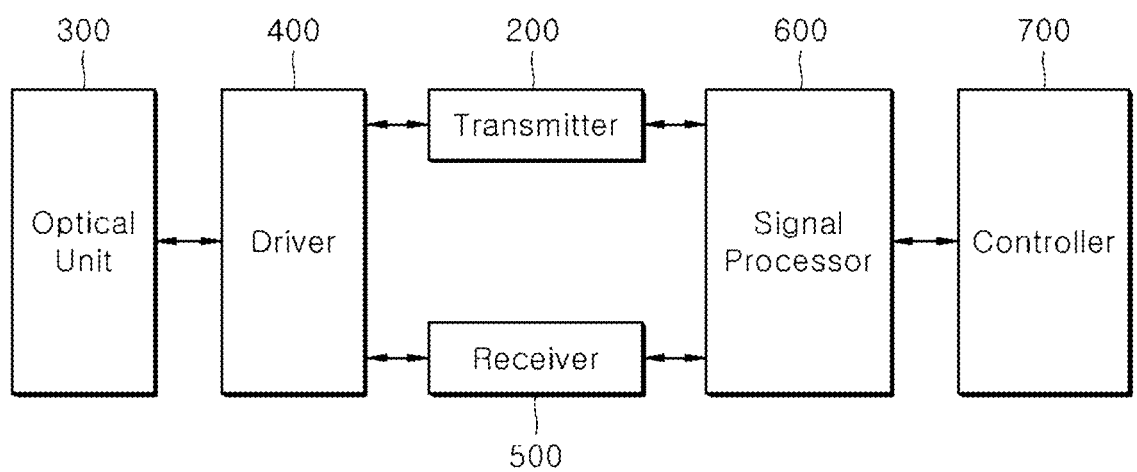
FIG. 2 schematically illustrates the detailed configuration of a LiDAR system in accordance with an embodiment of the present invention.
Figure 3A:
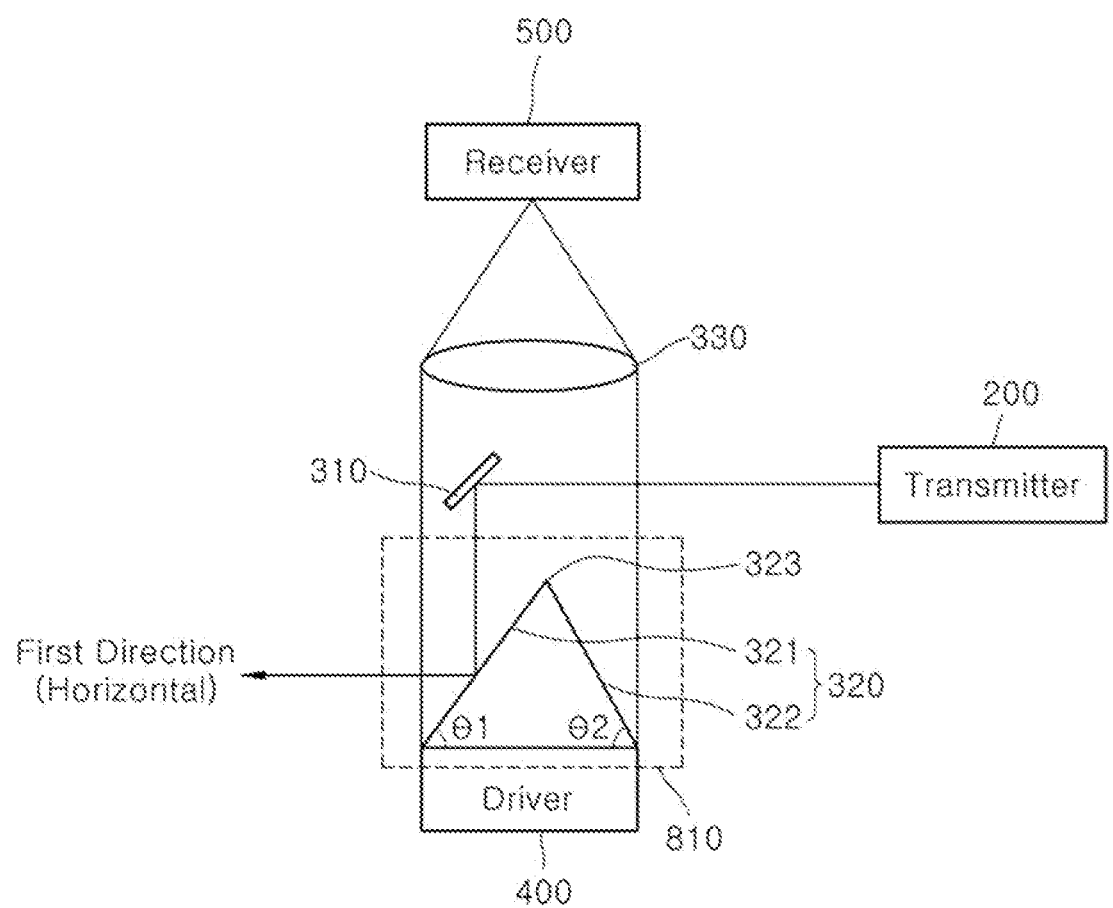
FIGS. 3A and 3B schematically illustrate the detailed configuration of an optical unit in the LiDAR system of FIG. 2.
Figure 3B:
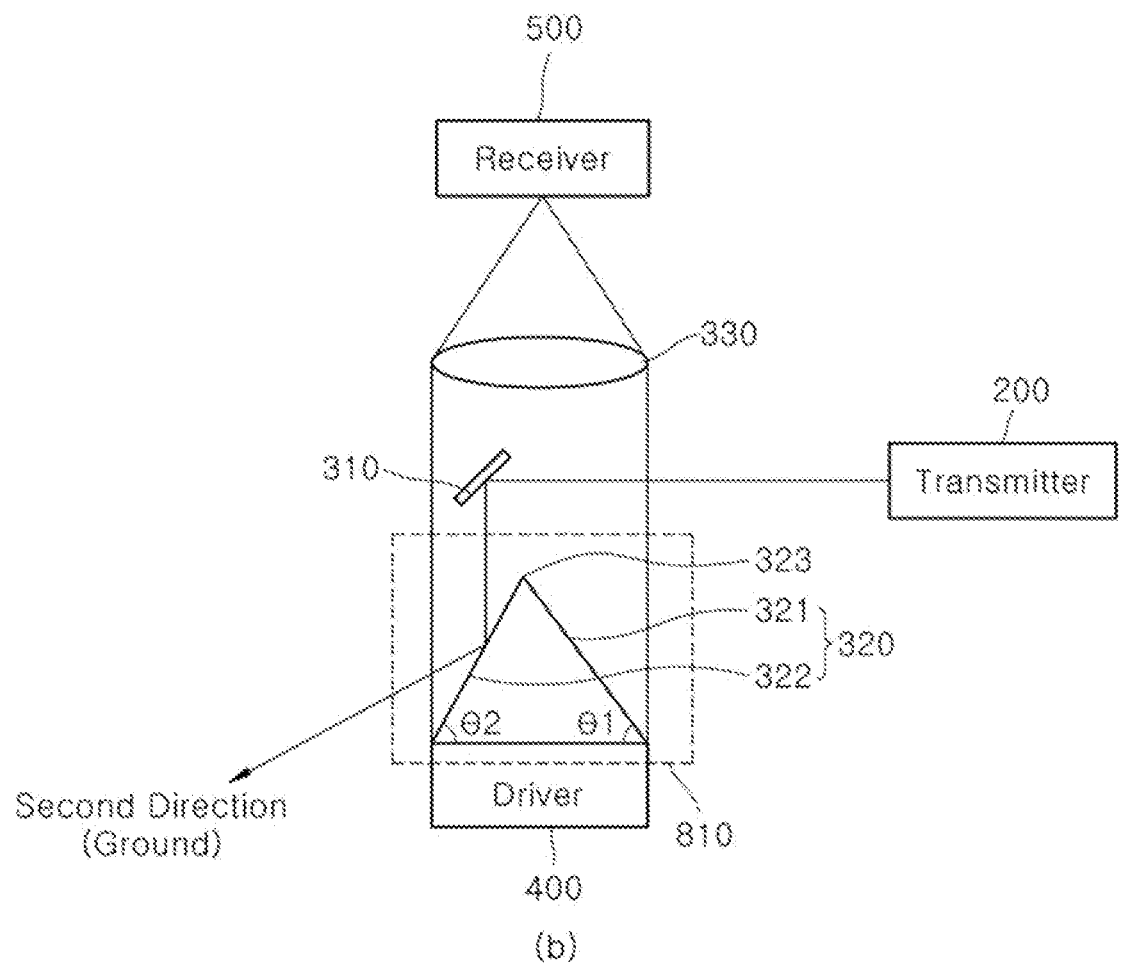
Figure 4A:
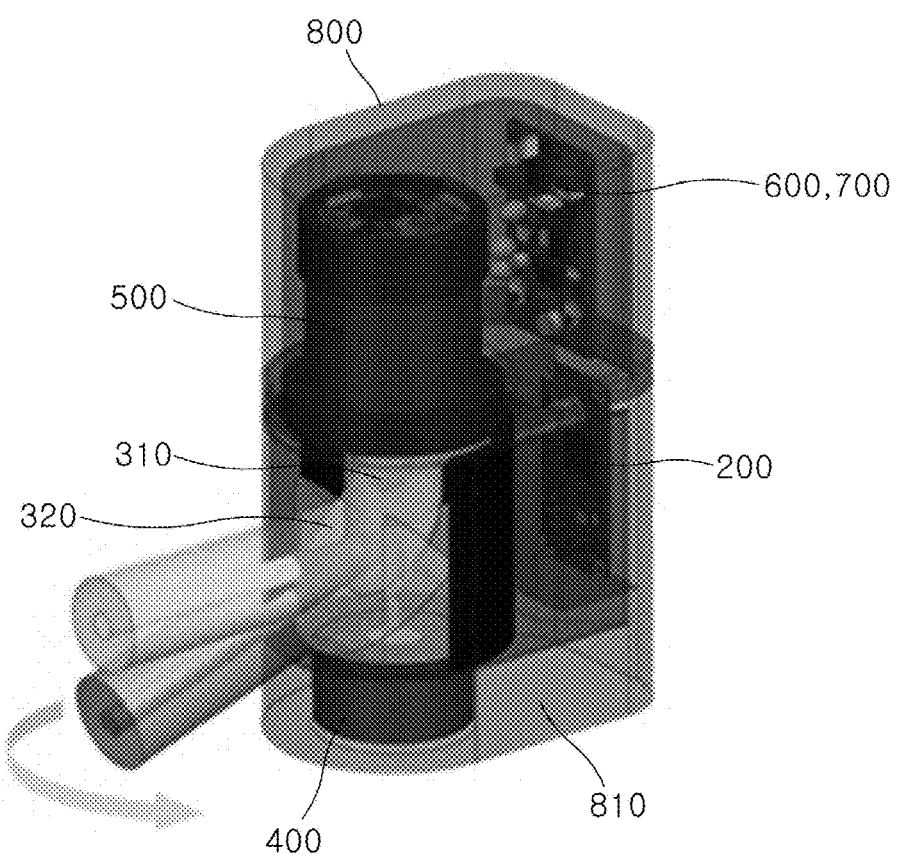
FIGS. 4A and 4B are perspective and exploded perspective views of the LiDAR system in accordance with the embodiment of the present invention.
Figure 4B:
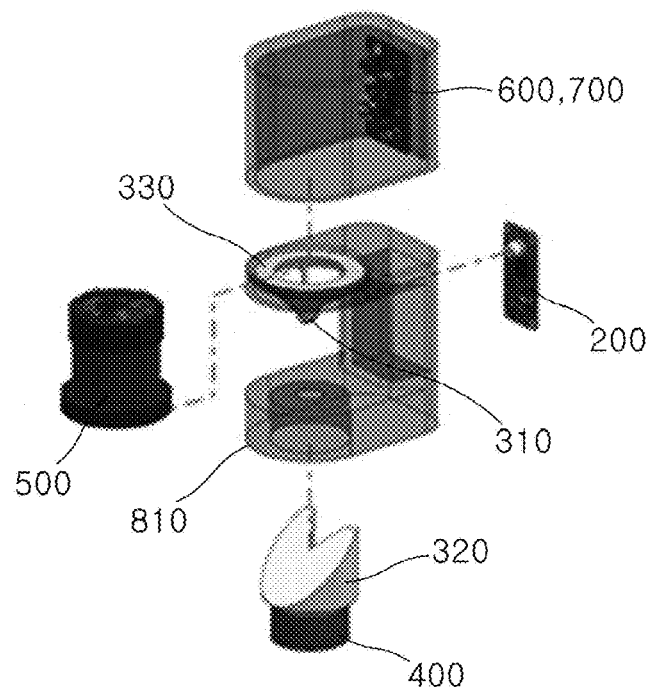

FIG. 2 schematically illustrates the detailed configuration of a LiDAR (Light Detection And Ranging) system in accordance with an embodiment of the present invention, FIGS. 3A and 3B schematically illustrate the detailed configuration of an optical unit in the LiDAR system of FIG. 2, and FIGS. 4A and 4B are perspective and exploded perspective views of the LiDAR system in accordance with the embodiment of the present invention.

Referring to FIGS. 2 to 4, the LiDAR system in accordance with the embodiment of the present invention may include a transmitter 200, an optical unit 300, a driver 400, a receiver 500, a signal processor 600, a controller 700 and a housing 800. In the present embodiment, the optical unit 300 may include a path control mirror 310, a reflecting mirror 320 and a light receiving lens 330, the reflecting mirror 320 including a first reflecting surface 321 and a second reflecting surface 322. Although not illustrated, the optical unit 300 may further include a light transmitting lens. The light transmitting lens may be included in the transmitter 200, and the light receiving lens 330 may be included in the receiver 500.

The transmitter 200 may generate pulse laser and transmit the generated pulse laser to the optical unit 300, under control of the controller 700. The pulse laser generated by the transmitter 200 may be transmitted to the optical unit 300 through the light transmitting lens. A method based on the pulse laser may be divided into a ToF (Time of Flight) method and a PS (Phase Shift) method, depending on a signal modulation method. The ToF method may indicate a method that measures a distance by emitting a pulse laser signal and measuring the times at which pulse signals reflected from objects within a measurement range reach the receiver 500. The PS method may indicate a method that calculates a time and distance by emitting a pulse laser signal which is sequentially modulated with a specific frequency, and measuring a phase shift of a signal reflected and returned from an object within a measurement range.

The optical unit 300 may reflect pulse laser from the transmitter 200, and transmit the reflected pulse laser to an object. Furthermore, the optical unit 300 may transmit light to the receiver 500, the light being reflected by the object in response to the received pulse laser. In the present embodiment, the optical unit 300 may include the path control mirror 310, the reflecting mirror 320 and the light receiving lens 330, the reflecting mirror 320 including the first reflecting surface 321 and the second reflecting surface 322.

The path control mirror 310 may reflect the pulse laser from the transmitter 200 to the reflecting mirror 320. That is, when the pulse laser from the transmitter 200 reaches the path control mirror 310, the path control mirror 310 may reflect the pulse laser to the reflecting mirror 320 to form an optical path of the pulse laser.

The reflecting mirror 320 may include two or more reflecting surfaces, reflect pulse laser to transmit to an object, and reflect light reflected from the object to the light receiving lens 330. In an embodiment, the reflecting mirror 320 may include the first and second reflecting surfaces 321 and 322. However, the reflecting mirror 320 is not limited thereto, but the number of reflecting surfaces can be increased or decreased.

In an embodiment, the first and second reflecting surfaces 321 and 322 may be connected to each other at one point (323 in FIG. 3), the tilt angle ($\theta 1$ in FIG. 3) of the first reflecting surface 321 and the tilt angle ($\theta 2$ in FIG. 3) of the second reflecting surface 322 may be different from each other, and the first reflecting surface 321 may be tilted in the opposition direction of the second reflecting surface 322. Compared to the related art, the first and second reflecting surfaces 321 and 322 may not be formed at right angles, but diagonally tilted at an angle of approximately 45 degrees. In this case, since the first and second reflecting surfaces 321 and 322 have the same light receiving area depending on a tilt angle, the same distance may be detected according to the tilt angle. Furthermore, since there is no limit to the maximum FOV, 360-degree scanning can be performed. The first and second reflecting surfaces 321 and 322 may have V-shaped grooves corresponding to each other.

In the present embodiment, the first reflecting surface 321 may reflect pulse laser in a first direction (horizontal direction) parallel to a horizontal plane, and the second reflecting surface 322 may reflect pulse laser in a second direction (ground direction) which is oblique to the horizontal plane. In the related art, the reflecting mirrors for detecting the first and second directions have been separately developed. In the present embodiment, however, since the driver 400 rotates the reflecting mirror 320, both of the first and second directions can be detected through the first and second reflecting surfaces 321 and 322. Therefore, when such a structure is applied to a parking system, for example, a bump or parking stopper as well as a surrounding object or parking lot structure can be easily detected. In addition, since a coaxial structure in which transmission and reception optical axes are the same is applied instead of a biaxial structure, the minimum detection distance of 0m can be achieved.

The reflecting mirror 320 may be covered by a cover window 810, thereby forming the housing 800. The cover window 810 may be formed of a material through which pulse laser and light reflected from an object can easily pass.

The light receiving lens 330 may transmit the light reflected through the first and second reflecting surfaces 321 and 322 to the receiver 500.

The driver 400 may include a motor (not illustrated) capable of rotating the reflecting mirror 320, and the rotational speed of the motor may be controlled by the controller 700. In the present embodiment, the driver 400 may further a shaft (not illustrated) to support the reflecting mirror 320, and the motor may be installed under the shaft. In an embodiment, the motor can rotate 360 degrees.

The receiver 500 may convert the light received by the light receiving lens 330 into an electrical signal. The receiver 500 may include a photodetector (not illustrated) to convert the received light into an electrical signal. The electrical signal detected by the photodetector may be outputted as an image signal through the signal processor 600, and the image signal may be provided in such a manner that a user can watch the image signal through a display device (not illustrated) such as a navigation system of the vehicle.

The signal processor 600 may amplify the electrical signal converted by the receiver 500, and transmit the amplified signal to the controller 700. Furthermore, the signal processor 600 may receive control signals for the transmitter 200, the optical unit 300, the driver 400 and the receiver 500 from the controller 700, convert the received signals into signals suitable for the corresponding components, and transmit the converted signals to the respective components.

The controller 700 may control the operations of the entire components from the transmitter 200 to the signal processor 600, and calculate the distance to an object and the speed of the object, based on the electrical signal which is converted by the receiver 500 and amplified by the signal processor 600. The distance to the object and the speed of the object, which are calculated by the controller 700, may also be calculated by the signal processor 600. That is, the signal processor 600 may be included in the controller 700.

The controller 700 may adaptively change the pulse width of the pulse laser transmitted by the transmitter 200, a transmission repetition rate including the number of pulse lasers transmitted by the transmitter 200 within a preset time, a reception repetition rate including the number of reflected lights received by the receiver 500 within a preset time, and the power value of the pulse laser, depending on the distance to the object and the speed of the object.

When the power of transmitted pulse laser is lowered and the transmission repetition rate and the reception repetition rate are raised, the resolution of the scan angle can be increased. Here, raising or lowering the power of the pulse laser may have the same effect as increasing or decreasing the pulse width of the pulse laser. Furthermore, when the number of received data used for distance detection is reduced, the detection distance may be increased while the angle resolution is decreased. Based on such characteristics, the distance detection, the detection interval and the detection performance may be variably applied according to the speed of the vehicle, depending on an indoor or outdoor situation.

For example, in order to detect the first direction, the pulse width of pulse laser may be increased, the power of the pulse laser may be raised, or the transmission repetition rate and the reception repetition rate may be raised to detect a long distance. In order to detect the second direction, the reverse parameters may be applied. That is, the pulse width of the pulse laser may be decreased, the power of the pulse laser may be lowered, and the transmission repetition rate and the reception repetition rate may be lowered. Furthermore, the pulse width of pulse laser with a specific pattern, the power of the pulse laser, and the transmission repetition rate and the reception repetition rate may be adjusted to remove interference between sensors.

Figure 5A:
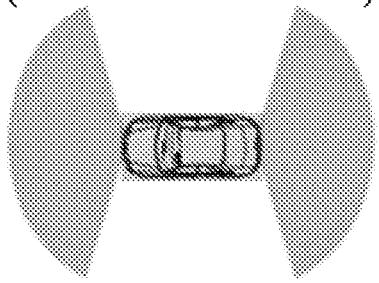
FIGS. 5A to 5C illustrate a sensing area of the LiDAR system according to the related art and a sensing area of the LiDAR system in accordance with the embodiment of the present invention.
Figure 5B:
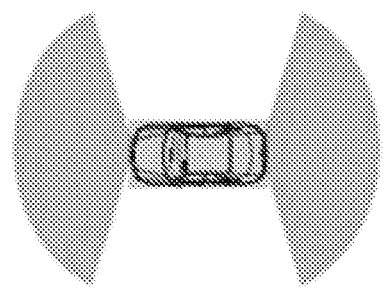
Figure 5C:
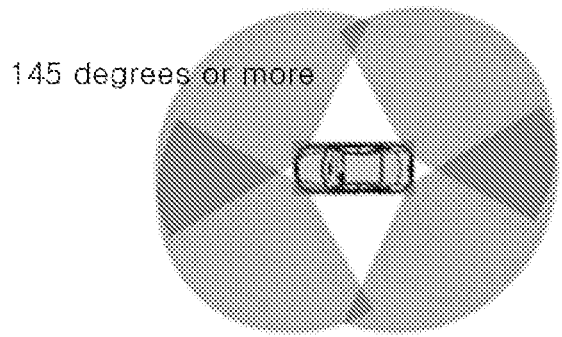

FIGS. 5A to 5C illustrate a sensing area of the LiDAR system according to the related art and a sensing area of the LiDAR system in accordance with the embodiment of the present invention. FIG. 5A illustrates the sensing area of the LiDAR system according to the related art, and FIGS. 5B and 5C illustrate the sensing area of the LiDAR system in accordance with the embodiment of the present invention.

Referring to FIG. 5A, the LiDAR system according to the related art needs to separately include the mirrors for sensing the first and second directions, and the maximum FOV is limited to 145 degrees. Referring to FIGS. 5B and 5C, however, the LiDAR system in accordance with the present embodiment can sense the first and second directions at the same time and perform 360-degree scanning without a limit to the maximum FOV, because the first and second reflecting surfaces are diagonally tilted at an angle of approximately 45 degrees.

Figure 6:
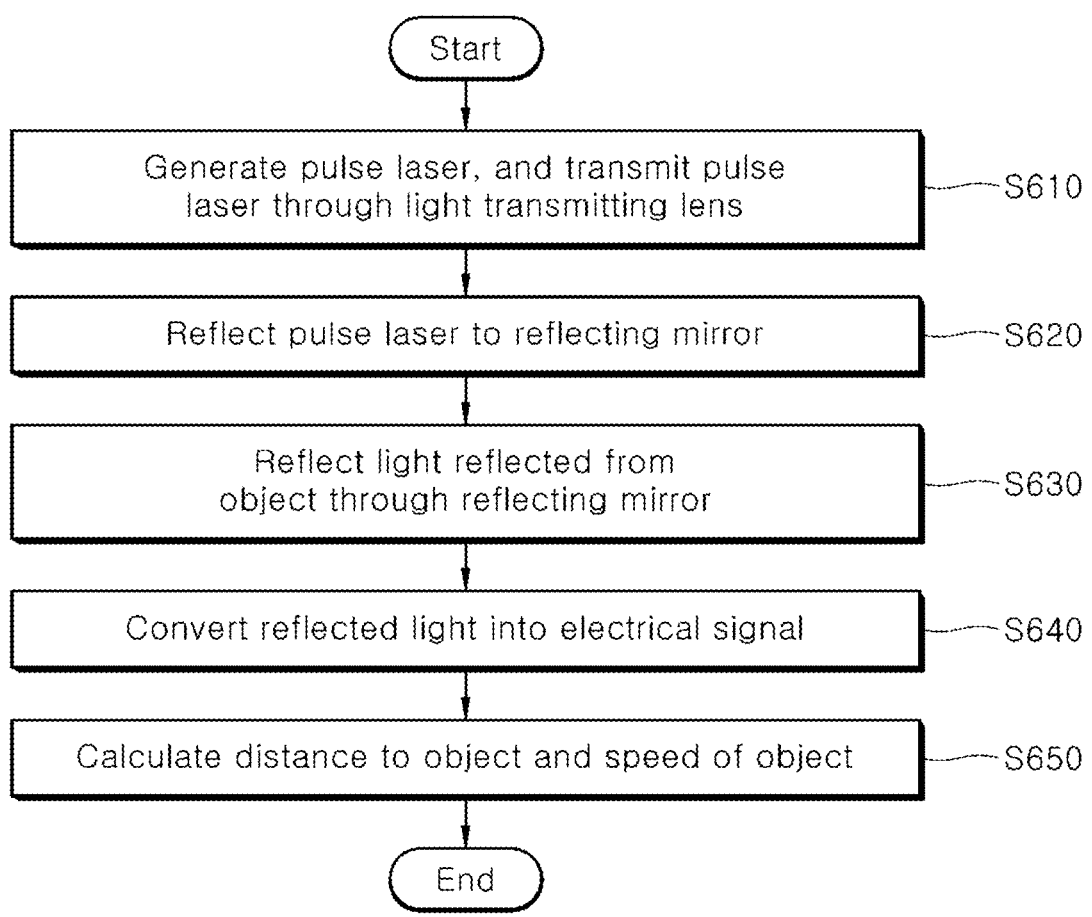
FIG. 6 is a flowchart illustrating an operating method of the LiDAR system in accordance with an embodiment of the present invention.

FIG. 6 is a flowchart illustrating an operating method of the LiDAR system in accordance with an embodiment of the present invention. Hereafter, descriptions overlapping with the descriptions of FIGS. 1 to 5 will be omitted.

Referring to FIG. 6, the transmitter 200 of the LiDAR system may generate pulse laser and transmit the generated pulse laser through the light transmitting lens, under control of the controller 700, at step S610.

At step S620, the path control mirror 310 of the optical unit 300 may reflect the received pulse laser to the reflecting mirror 320, and the reflecting mirror 320 may reflect the pulse laser to transmit to an object.

In an embodiment, the reflecting mirror 320 may include the first and second reflecting surfaces 321 and 322. Upper edges of the first and second reflecting surfaces 321 and 322 may be connected to each other, the tilt angle of the first reflecting surface 321 and the tilt angle of the second reflecting surface 322 may be different from each other, and the first reflecting surface 321 may be tilted in the opposite direction of the second reflecting surface 322. The first and second reflecting surfaces 321 and 322 may have V-shaped grooves corresponding to each other. In the present embodiment, the first reflecting surface 321 may reflect the pulse laser in the first direction (horizontal direction) parallel to a horizontal plane, and the second reflecting surface 322 may reflect the pulse laser in the second direction (ground direction) perpendicular to the horizontal plane. Since the driver 400 rotates the reflecting mirror 320, both of the first and second directions can be sensed through the first and second reflecting surfaces 321 and 322.

At step S630, the light reflected from the object may be reflected through the first and second reflecting surfaces 321 and 322 of the reflecting mirror 320 of the optical unit 300.

At step S640, the light reflected by the reflecting mirror 320 may be transmitted to the receiver 500 through the light receiving lens, and the receiver 500 may convert the reflected light into an electrical signal.

At step S650, the controller 700 may calculate the distance to the object and the speed of the object using the electrical signal converted by the receiver 500.

The controller 700 may adaptively change the pulse width of the pulse laser transmitted by the transmitter 200, a transmission repetition rate including the number of pulse lasers transmitted by the transmitter 200 within a preset time, a reception repetition rate including the number of reflected lights received by the receiver 500 within a preset time, and the power value of the pulse laser, depending on the distance to the object and the speed of the object.

In accordance with the embodiments of the present invention, it is possible to maximize the FOV while reducing a hardware unit price and size.

Furthermore, the LiDAR system can perform ground detection as well as horizontal detection.

The above-described embodiments of the present invention may be implemented in the form of computer programs which can be executed on a computer through various components, and the computer programs may be recorded in a computer readable medium. At this time, the medium may include a magnetic medium such as a hard disk, floppy disk or magnetic tape, an optical recording medium such as a CD-ROM or DVD, a magneto-optical medium such as a floptical disk, and a hardware device such as a ROM, RAM or flash memory, which is specifically configured to store and execute program commands.

The computer program may include an available program which is specifically designed and configured for the present invention, or publicly known to those skilled in the computer software field. Examples of the computer program may include high-level language codes which can be executed by a computer through an interpreter, as well as machine language codes which are generated by a compiler.

In the specification (or particularly claims) of the present invention, the use of the term "the" and directional terms similar to "the" may correspond to a singular form or plural forms. Furthermore, when a range is described in the present invention, it may indicate that the present invention includes an embodiment to which individual values belonging to the range are applied (unless referred to the contrary), and the individual values constituting the range are described in the detailed descriptions of the invention.

The steps constituting the method in accordance with the embodiment of the present invention may be performed in suitable order, when the order of the steps is clearly specified or unless referred to the contrary. The present invention is not limited to the order of the steps. In the present invention, all examples or exemplary terms (for example, and the like) are simply used to describe the present invention in detail. The scope of the present invention is not limited by the examples or exemplary terms, as long as the scope of the present invention is not limited by claims. Furthermore, it is obvious to a person skilled in the art that various modifications, combinations and changes can be made according to design conditions and factors within the scope of claims or equivalents.

Therefore, the spirit of the present invention is not limited to the above-described embodiments, and all ranges which are equivalent to the following claims or equivalently changed from the claims, as well as the claims, may be considered as being included in the sprit of the present invention.

What is claimed is:

1. A LiDAR (Light Detection And Ranging) system comprising:
   a transmitter to output a pulse laser;
   a reflecting mirror comprising first and second reflecting surfaces to reflect the pulse laser, the first reflecting surface and the second reflecting surface being disposed in intersecting planes, with the first reflecting surface being tilted at a first tilt angle in an opposite direction from the second reflecting surface tilted at a second tilt angle different from the first tilt angle;
   a driver to rotate the reflecting mirror;

a path control mirror arranged above the reflecting mirror and configured to reflect the pulse laser to the reflecting mirror to form an optical path of the pulse laser;

a receiver to receive a light reflected through the reflecting mirror, and convert the received light into an electrical signal; and a controller to calculate a distance to an object and a speed of the object, using the electrical signal converted by the receiver, wherein:

the controller iteratively changes a pulse width of the pulse laser transmitted by the transmitter, a transmission repetition rate including a number of pulse lasers transmitted by the transmitter within a preset time, a reception repetition rate including a number of reflected lights received by the receiver within the preset time, and a power value of the pulse laser, based upon the distance to the object and the speed of the object;

upper edges of the first and second reflecting surfaces are connected to each other; and the first and second reflecting surfaces are flat surfaces and have V-shaped grooves corresponding to each other, with the apex of the each of the V-shaped grooves being located in each of the flat surfaces.

2. The LiDAR system of claim 1, wherein the first reflecting surface is configured to reflect the pulse laser in a first direction substantially parallel to a horizontal plane, and the second reflecting surface is configured to reflect the pulse laser in a second direction substantially oblique to the horizontal plane.

3. The LiDAR system of claim 1, wherein the driver comprises a motor to rotate the reflecting mirror 360 degrees.

4. An operating method of a LiDAR system having a rotatable reflecting mirror is rotated including first and second reflecting surfaces disposed in intersecting planes at different tilt angles, the method comprising the steps of:

outputting a pulse laser;

reflecting, by a path control mirror arranged above the reflecting mirror, the pulse laser to form an optical path of the pulse laser;

reflecting, by the reflecting mirror, the pulse laser reflected by the path control mirror;

receiving light reflected by the reflecting mirror, and converting the received light into an electrical signal;

calculating in a controller a distance to an object and a speed of the object, using the electrical signal; and iteratively changing in the controller a pulse width of the pulse laser, a transmission repetition rate including a number of pulse lasers transmitted within a preset time, a reception repetition rate including a number of reflected lights received within the preset time, and a power value of the pulse laser, based upon the distance to the object and the speed of the object, wherein:

upper edges of the first and second reflecting surfaces are connected to each other; and the first and second reflecting surfaces are flat surfaces and have V-shaped grooves corresponding to each other, with the apex of the each of the V-shaped grooves being located in each of the flat surfaces.

5. The operating method of claim 4, wherein the step of reflecting, by the reflecting mirror, the pulse laser reflected by the path control mirror comprises reflecting the pulse laser from the first reflecting surface in a first direction substantially parallel to a horizontal plane, and reflecting the pulse laser from the second reflecting surface in a second direction substantially oblique to the horizontal plane.

6. The operating method of claim 4, further comprising rotating the reflecting mirror 360 degrees.

* * * * *